US011897203B1

(12) United States Patent
Cui et al.

(10) Patent No.: US 11,897,203 B1
(45) Date of Patent: Feb. 13, 2024

(54) FREQUENCY DOMAIN SPATIAL PACKING FOR 3D FABRICATION

(71) Applicant: Inkbit, LLC, Medford, MA (US)

(72) Inventors: Qiaodong Cui, Arlington, MA (US); Wojciech Matusik, Lexington, MA (US); Victor Rong, Cambridge, MA (US)

(73) Assignee: Inkbit, LLC, Medford, MA (US)

( * ) Notice: Subject to any disclaimer, the term of this patent is extended or adjusted under 35 U.S.C. 154(b) by 0 days.

(21) Appl. No.: 17/955,843

(22) Filed: Sep. 29, 2022

(51) Int. Cl.
*B29C 64/393* (2017.01)
*B33Y 50/02* (2015.01)
*B29C 64/171* (2017.01)

(52) U.S. Cl.
CPC .......... *B29C 64/393* (2017.08); *B29C 64/171* (2017.08); *B33Y 50/02* (2014.12)

(58) Field of Classification Search
CPC .................................................. B29C 64/393
See application file for complete search history.

(56) References Cited

U.S. PATENT DOCUMENTS

| | | | |
|---|---|---|---|
| 2018/0133969 A1* | 5/2018 | Huang ................... | B29C 64/171 |
| 2020/0057030 A1* | 2/2020 | Hartwig ................ | G01N 29/043 |
| 2020/0193716 A1* | 6/2020 | Ge .......................... | G06T 17/05 |
| 2021/0039320 A1* | 2/2021 | Tucker ................... | G06F 30/20 |
| 2021/0162659 A1* | 6/2021 | Woodlock ............. | B29C 64/386 |
| 2021/0283850 A1* | 9/2021 | Zeng ...................... | B33Y 50/00 |

FOREIGN PATENT DOCUMENTS

WO     WO-2021154244 A1 *   8/2021   .......... B29C 64/386

OTHER PUBLICATIONS

Katchalski-Katzir, Ephraim, Isaac Shariv, Miriam Eisenstein, Asher A. Friesem, Claude Aflalo, and Ilya A. Vakser. "Molecular surface recognition: determination of geometric fit between proteins and their ligands by correlation techniques." Proceedings of the National Academy of Sciences 89, No. 6 (1992): 2195-2199.
Lysenko, Mikola, and Vadim Shapiro. "Effective contact measures." Computer-Aided Design 70 (2016): 134-143.
Zhao et al., "A Comparative Review of 3D Container Loading Algorithms," International Transactions in Operational Research, pp. 1-39, 2014.
Nelaturi, Saigopal, Mikola Lysenko, and Vadim Shapiro. "Rapid mapping and exploration of configuration space." (2012): 021007.
Lysenko, Mikola, Saigopal Nelaturi, and Vadim Shapiro. "Group morphology with convolution algebras." In Proceedings of the 14th ACM symposium on solid and physical modeling, pp. 11-22. 2010.
Nelaturi, Saigopal, Morad Behandish, Amir M. Mirzendehdel, and Johan de Kleer. "Automatic support removal for additive manufacturing post processing." Computer-Aided Design 115 (2019): 135-146.

* cited by examiner

Primary Examiner — Suresh Suryawanshi
(74) Attorney, Agent, or Firm — Occhiuti & Rohlicek LLP

(57) ABSTRACT

Arrangement of the parts, particularly addressing arrangement for 3D fabrication, makes use of spatial frequency domain representations of the parts, such that acceptable (or optionally desirable) relative locations (and optionally orientations) of a part relative to another part or an arrangement of multiple other parts makes use of spatial frequency domain representations of the parts. In some examples, acceptable relative locations may be defined as relative locations that do not result in parts spatially overlapping and/or maintain a desired (e.g., minimum, average, etc.) separation between parts.

18 Claims, 5 Drawing Sheets

FREQUENCY DOMAIN SPATIAL PACKING FOR 3D FABRICATION

BACKGROUND OF THE INVENTION

This invention relates to packing of objects for 3D fabrication.

One approach to 3D fabrication of a batch of parts is to spatially arrange the parts to specify an overall fabrication volume fully containing the parts. Each part is positioned in a particular orientation in the volume, and the parts are fabricated together, for example, using a jetting additive fabrication approach in which layers of material are progressively added to form the overall fabrication volume. The specified volume generally includes support material on which parts are formed, and at least some parts are separated from one another by the support material.

The chosen arrangement of the parts in the fabrication volume may affect the speed and/or cost of fabrications according to factors, including for instance the overall height to the volume (i.e., the height of the top-most part) or the amount of support material that is needed to form the overall build volume.

SUMMARY OF THE INVENTION

There is a need to arrange the parts relative to one another to achieve desirable overall printing characteristics, including one or a combination of a fastest anticipated printing time and lowest material cost.

In one aspect, in general, arrangement of the parts makes use of spatial frequency domain representations of the parts, such that acceptable (or optionally desirable) relative locations (and optionally orientations) of a part relative to another part or an arrangement of multiple other parts makes use of spatial frequency domain representations of the parts. In some examples, acceptable relative locations may be defined as relative locations that do not result in parts spatially overlapping and/or maintain a desired (e.g., minimum, average, etc.) separation between parts.

In some examples, an approach to arranging more than two parts involves successive iterations in which in each iteration a part is place relatively to previously placed parts, until all the parts are placed, thereby defining the overall arrangement. In some examples, the iterations may involve moving or removing previously placed parts.

The overall build volume (i.e., a three-dimensional shape) that bounds the arrangement of parts may be predefined, or at least partly resulting from the arrangement of the parts. For example, as many parts as possible may be arranged into a predefined volume, while in other examples, some aspects of the shape (e.g., the overall height) may be determined as a result of the arrangement procedure.

In one aspect, in general, a method for arranging a plurality of parts into a build volume for three-dimensional fabrication includes receiving a specification of a shape each part of a plurality of parts. In some instances, the specification of a shape may be a voxel-based representation. The parts are arranged in a build volume. This arranging includes, for each least a first part of the plurality of parts arranging the first part relative to an arrangement including one or more previously arranged parts of the plurality of parts. The arranging of the first part includes using a first spatial frequency representation of the shape of the first part determined from the first part as well as using a second spatial frequency representation of the arrangement, and using these spatial frequency representations determining a relative location of the first part and the arrangement. The first part is then added to the arrangement at the determined relative location. Finally, a specification of a build volume for three-dimensional fabrication is formed according to the arrangement and provided for use in a three-dimensional fabrication system.

Aspects can include one of more of the following features.

A spatial frequency of shapes of at least some parts of the plurality of parts is determined.

Determining the relative location of the first part and the arrangement includes processing the first spatial frequency representation and the second spatial frequency representation to yield a third spatial frequency representation, and processing the third spatial frequency representation to yield third spatial representation.

Determining the relative location of the first part and the arrangement further includes processing the third spatial representation includes searching the third spatial representation for the relative location for the arrangement.

In any of the preceding combination, the first spatial frequency representation of the shape of the first part comprises a Fourier Transform of a volume occupied by the first part, and the second spatial frequency representation of the arrangement comprises a Fourier Transform of a spatial preference distribution at offsets of the first part and the arrangement.

The spatial preference distribution represents one or more of (a) a preference for placement of the first part in proximity to parts of the arrangement, (b) a preference to reduce support volume for supporting placed parts, and (c) a preference of reduced height of arrangement of parts within the build volume.

Using the first spatial frequency representation of the shape of the first part determined from the first part and the second spatial frequency representation of the arrangement includes determining a third spatial frequency representation over offsets of the first part relative to the arrangement.

Using the first spatial frequency representation of the shape of the first part determined from the first part and the second spatial frequency representation of the arrangement further includes determining a spatial distribution over offsets of the first part relative to the arrangement.

Determining a spatial distribution over offsets of the first part relative to the arrangement includes determining an inverse Fourier Transform of the third spatial frequency distribution.

In any of the previous combinations, for at least the first part of the plurality of parts, a plurality of rotations of the first part are used to determine a rotation of said first part for adding to the arrangement.

A spatial frequency representation of the first part is determined in each of the plurality of rotations.

In any of the preceding combinations, for at least one part of the plurality of parts, the spatial frequency representation of the arrangement represents a build volume without any parts yet placed within it.

In another aspect, in general, a system for arranging a plurality of parts into a build volume for three-dimensional fabrication, the system comprising one or more hardware processors, and a storage for instructions for execution by said one or more hardware processors that when executed cause the system to perform all the steps of any one of methods set forth above. At least some of the hardware processors may comprise a graphics processing units capable of parallel computations.

In another aspect, in general, a non-transitory machine-readable medium comprising instructions stored thereon, the instructions when executed by one or more hardware processors cause said processors to perform all the steps of any one of the methods set forth above.

Other features and advantages of the invention are apparent from the following description, and from the claims.

DETAILED DESCRIPTION

Figure 1:
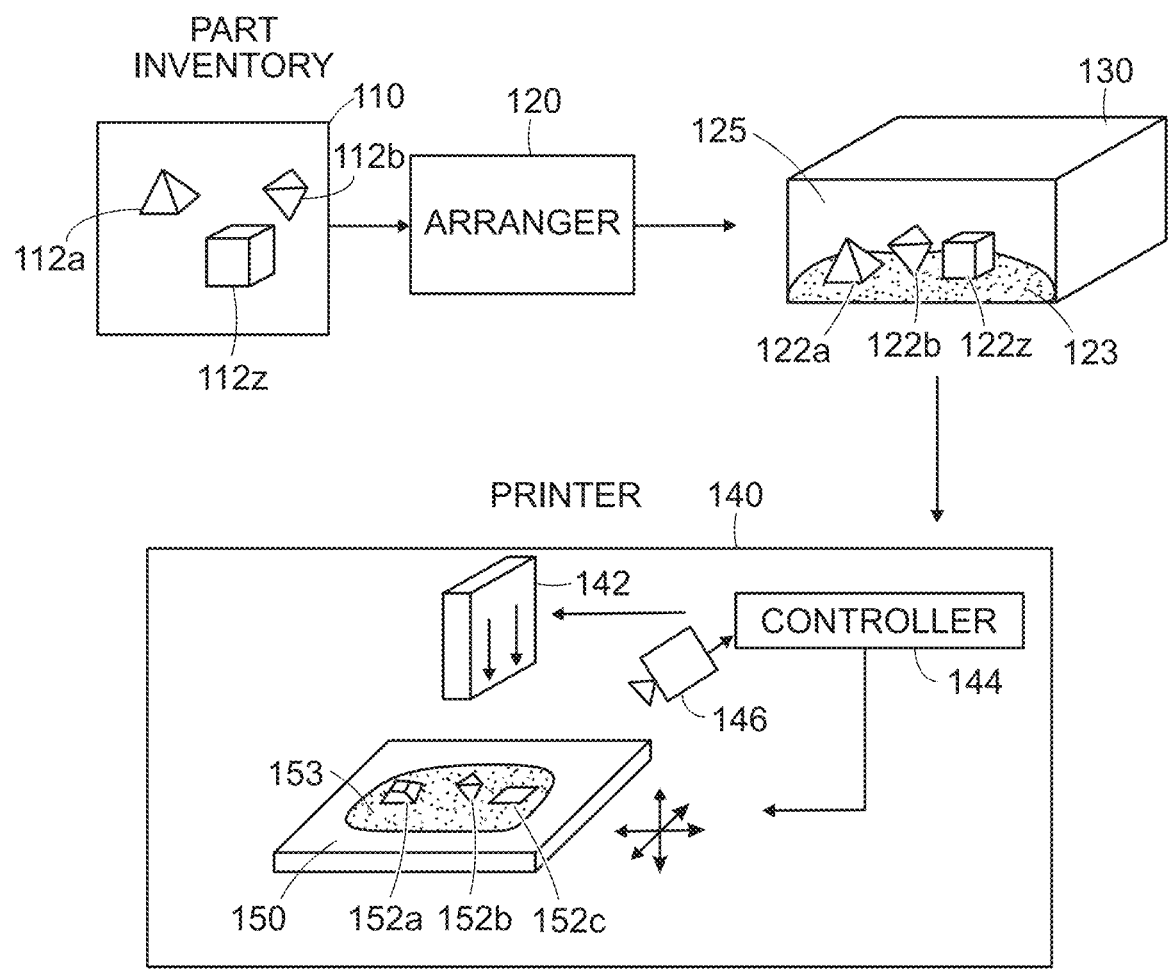
FIG. 1 is a system diagram.

Referring to FIG. 1, an additive fabrication system 100 includes a printer 140, which includes a printhead assembly 142, which can controllably jet a number of materials, including a support material (e.g., a phase-change material, such as a wax) and at least one build material (e.g., a curable material, such as an ultraviolet light curable epoxy). A controller 144 receives vision feedback from a vision system 146, and controls the printhead assembly 142 and a three-degree-of freedom motion system for a build platform 148, such that the coordination of movement of the build platform and jetting of materials from the printhead assembly 142 causes successive layers of material to be deposited to form a 3D object according to a specification received by the controller. Suitable fabrication systems 100 are described in U.S. Pat. Nos. 10,252,466, 10,994,490, and 10,456,984 and co-pending application Ser. No. 17/197,581, filed Mar. 10, 2021, the entire contents of which are incorporated herein by reference.

Continuing to refer to FIG. 1, the specification 130 of the build volume is provided to the printer 140. This specification describes the overall arrangement of individual parts 122a-z and support material 123 (leaving unfilled volume 125 in the build volume) that is to be printed by the printer. The specification is stored in a data structure, which is used by the controller to determine which material (if any) to print at each three-dimensional addressable location in the build volume. In some examples, this data structure comprises a voxel representation in which each voxel (i.e., each regularly arranged region, such as a cube) is associated with one or alternatively a mixture of materials, or is identified as being empty. In other examples, a solid model representation is used, for example, with bounding surfaces (e.g., planar tessellations) defining transitions between materials (e.g., between the support material and a build material, between build materials, and/or between a build material and "empty" space).

Regardless of the specific form of the data structure representing build volume specification 130, this specification is determined by an arranger 120, which implements a procedure described below to use specifications of the shapes (and optional internal multi-build-material structures) of multiple parts of a part inventory 110 that are to be fabricated. These shape specifications 112a-z may be represented as voxel representations or solid models.

One procedure that is implemented by the arranger 120 determines the possible (i.e., non-overlapping) relative positions of a part relative to another part or relative to a fixed arrangement of multiple other parts or objects. For example, for two parts, A and B, the shapes of each part can be represented as an arrays of indicator values, $f_A(x, y, z)$ and $f_B(x, y, z)$, that have a value 1 if that (x, y, z) indexed voxel is within the volume of the part and 0 otherwise. For example, the array is an N×N×N array, where N is greater than the maximum size of the build volume in any direction, for example, at least twice the maximum size. Note that the indices (x, y, z) are relative to an origin point (e.g., the lowest occupied coordinate index in each dimension) for each of the shapes. With such arrays, if their origins are aligned, then the sum of $f_A(x, y, z)f_B(x, y, z)$ over all locations (x, y, z) is zero if there is no overlap, and is greater than zero, specifically representing the number of overlapping voxels, when the objects overlap. For simplicity of notation, the triple (x, y, z) is denoted as a vector $x=(x_1, x_2, x_3)$ below.

To the extent that object B is displaced by in the three dimensions according to a vector t, then if there is no overlap, the following sum over all locations x must be zero:

$$g_{A,B}(t) = \sum_x f_A(x)f_B(x-t) = 0$$

For example, the elements of the displacement t are assumed positive, and $f_B$ is assumed zero with negative coordinate indices. A search over relative displacements t of the objects to find those displacements in which the objects do not overlap can involve substantial computation for each possible displacement to determine if there is no overlap.

While computing $g_{A,B}(t)$ for all t may be computationally expensive, a preferable approach is to first compute the Discrete Fourier Transform (DTF) of the array for each part to represent the shape in a spatial frequency domain. For example, for part A, this computation can be expressed as:

$$F_A(\omega) = \sum_x f_A(x)\exp(-j\omega \cdot x(2\pi/N))$$

where j is the square root of −1 and · is the dot (inner) product of two vectors, and $\omega=(\omega_1, \omega_2, \omega_3)$ are spatial frequency indices (i.e., $0 \leq \omega_i < N$) and the summation is over each of the dimensions ($0 \leq x_i < N$). Note that $F_A$ is an N×N×N array (i.e., a three-dimensional array) of complex quantities (in general). For conciseness, this computation of the DFT can be expressed as $F_A = \mathcal{F}(f_A)$, and the inverse operation is expressed as $f_A = \mathcal{F}^{-1}(F_A)$.

A useful property of the DTF is that one the summation over possible relative displacements shown above can be expressed as $$G_{A,B}(\omega) = F_A(\omega)F_B^*(\omega)$$

where the superscript * denotes a complex conjugate operation (negating the imaginary component of the complex number) and the multiplication of $F_A$ and $F_B$ is elementwise over frequencies $\omega$. Therefore, determining the relative displacements for which there is no overlap involves computing:

$$g_{A,B} = \mathcal{F}^{-1}(G_{A,B})$$

A computationally efficient procedure for computing the DFT is the Fast Fourier Transform (FFT). In some examples, particular FFT implementations that take advantage of knowledge that the input in the spatial domain is real while the output in the transform domain is complex are used to reduce the number of arithmetic operations, while in other examples, the real representations are first converted to complex number form before performing the FFT, and then retaining only the real part of a result after performing the inverse FFT.

Note that rotation of the shape in multiples of 90 degrees around any axis (keeping the origin of the array fixed) corresponds to a relatively simple manipulation of the DFT of the shape. In particular, for each of the 23 possible combined rotations of a part, the DFT of the rotated part can be computed directly from the DFT of the part without rotation by changing the order of indices and/or negation or complex-conjugate operations on values. More generally, rotations other than by multiplex of 90 degrees around the axes may be considered for packing, for example it is possible to attempt different possible object orientations by using a uniform distribution of orientations over the sphere. Different rotational discretization can be obtained by subdividing an icosahedron. Some orientations can be excluded from the search if they are undesired. For example, some object orientations can cause surface or warping artifacts. Some orientations may be found with geometry-based approaches. For example, one way is aligning the parts with the void space with the iterative closest point algorithm. Rotating the object in the frequency domain with arbitrary angles (i.e., non 90 degrees) may require resampling in the frequency domain, which may lead to precision loss, in which case rotation may be preferably performed in the spatial sample (voxel) domain, with the spatial frequency domain representations being computed after spatial rotation.

Turning now to a procedure for choosing a placement of a part B relative to a part A by determining the offset vector t, one way is to perform the following placement procedure:
1. Compute $G_{A,B}(\omega) = F_A(\omega) F_B^*(\omega)$
2. Compute $g_{A,B} = \mathcal{F}^{-1}(G_{A,B})$
3. Determine a set of possible relative positions $\mathcal{T} = \{t | g_{A,B}(t) = 0\}$
4. Choose a best relative displacement $t \in \mathcal{T}$ to place part B relative to part A.

This process may be repeated maintaining a shape of all the placed parts, which can be represented as an object A, and repeating the process above:
1. $f_A(x) \leftarrow$ shape of build volume (e.g., a one-voxel wide bounding surface of the permitted build volume)
2. Repeat for each unplaced part B (e.g., in order of decreasing size):
   a. Place B relative to A using a placement procedure at a "best" offset t
   b. Replace A with the combination of A and B (i.e., $f_A(x) \leftarrow f_A(x) + f_B(x-t)$ or $F_A(\omega) \leftarrow F_A(\omega) + F_B(\omega) \exp(+j\omega \cdot t))$ Note that there may be a number of different ways in which the best displacement t may be determined. For example, each displacement for which $g_{A,B}(t)$ is zero can be further quantified, for example, according to a criterion such as the largest remaining unused space (i.e., to leave space for unused objects), the lowest maximum height of an object, closeness to other parts, etc. But it may be recognized that computing such quantifications may themselves be computationally expensive.

In an alternative, for a given object A (e.g., the assembly of a number of parts), voxels in the volume are assigned penalty for filling, and in one example, voxels near other objects may be preferably filled as compared to voxels that are far from any object, which are penalized. Such a penalty causes parts to be placed close to one another. Below, the indicator function $f(x)$ is denoted with a superscript $f^c(x)$ (for "collision"), and a preference function $f^d(x)$ ("d" for "density") is introduced that has the voxel based penalty for placing further objects. With this density function, an overall penalty for positioning a part B near an object (e.g., an assembly of parts) A can be quantified as $$g_{A,B}^d(t) = \sum_x f_A^d(x) f_B^c(x-t)$$

such that a preferred displacement t minimizes $g^d$. Note that as with the non-overlap (i.e., non-collision) criterion, this can also be computed in the spatial frequency domain as:

$$G_{A,B}^d(\omega) = F_A^d(\omega) F_B^{c*}(\omega)$$

and $$g_{A,B}^d = \mathcal{F}^{-1}(G_{A,B}^d)$$

One way of computing $f_A^d(x)$ from $f_A^c(x)$ is as a distance field of the existing object A, which is computed for every voxel (x). For each voxel, $f_A^d(x)$ measures the distance to the closest voxel that is occupied by the existing object A. It is defined as zero on the occupied voxels (i.e., $f_A^d(x) = 0$ if $f_A^c(x) = 1$), and ramps up as the voxel moves away from the occupied voxel.

Using this computation, the selection of a best displacement $t \in \mathcal{T}$ above can be performed by minimizing $g_{A,B}^d(t)$ over the set of displacements $\mathcal{T}$.

In an alternative, the density may be defined as a preference, such that a maximum may be sought over displacements for which $g_{A,B}^c(t) = 0$. For example, one can define density as a smearing (e.g., a convolution) of the collision indicator with a kernel function. In principle the density function $f_A^d(x)$ can be any function that smoothly extends the collision indicator into the empty space and differentiates positions that are near or far from the list of placed objects A. For example, by computing a distance function, or convolving the collision indicator with a suitable kernel function (a box or Gaussian kernel).

Figure 2:
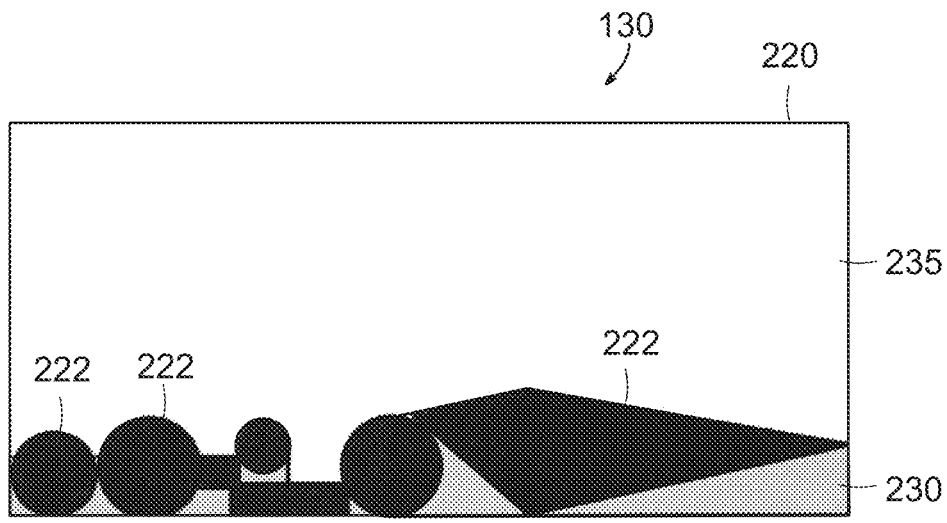
FIG. 2 is a 2-dimensional view of a build volume specification.

Another quantification of possible (i.e., non-overlapping/non-colliding) positionings of a part B relative to an object A is based on a "volume" metric, which generally penalizes placing parts in a manner that increases the support volume. Referring to FIG. 2, support material 230 is generally placed below parts 222, but is not needed above parts in the build volume 220 (shown as unfilled region 235). A goal is to determine the resulting volume of support material or the total volume of support and built material that results from placement of a part. A voxel-based penalty may be defined as $$f_A^v(x) = \begin{cases} 0 & \text{if } f_A^c(x) = 1 \\ x_3 - \text{height}_A(x_1, x_2) & \text{if } f_A^c(x) = 0 \end{cases}$$

where $x_3$ is the height coordinate of x (i.e., increasing as the height increases) and $\text{height}_A(x_1, x_2) = \max x_3$ over $f_A^c(x_1, x_2, x_3) = 1$.

To compute total occupied volume (including support) of the part being placed, the top surface indicator is define as:

$$f_B^t(x) = \begin{cases} 1 & \text{if } f_B^c(x) = 1 \text{ and } x_3 = \text{height}_B(x_1, x_2) \\ 0 & \text{otherwise} \end{cases}.$$

With these definitions, volume-based penalty may be defined as $$g_{A,B}^v(t) = \sum_x f_A^v(x) f_B^t(x - t)$$

and a selection of displacement t may be chosen to minimize $g_{A,B}^v(t)$. As above, this penalty can be computed in the spatial frequency domain.

Another quantification of possible positionings of a part B relative to an object A is based on a "height" metric, which generally penalizes placing parts in a manner that increases the height and/or prefers placing part a low as possible. For example, a voxel-based penalty may be defined as:

$f_A^h(x) = \alpha x_3$ where $\alpha$ is a positive penalization factor, for example, $\alpha=2$. The height-based penalty may be defined as:

$$g_{A,B}^h(t) = \sum_x f_A^h(x) f_B^c(x - t)$$

In some examples, selection of a displacement t may be chosen to minimize a combined penalty such as $\theta g_{A,B}^h(t) + (1-\theta) g_{A,B}^v(t)$ for some relative weighting $0<\theta<1$ or as $\theta_1 g_{A,B}^d(t) + \theta_2 g_{A,B}^v(t) + \theta_3 g_{A,B}^h(t)$ for some relative weighting $$0 < \theta_i < 1, \sum_i \theta_i = 1.$$

Figure 7:
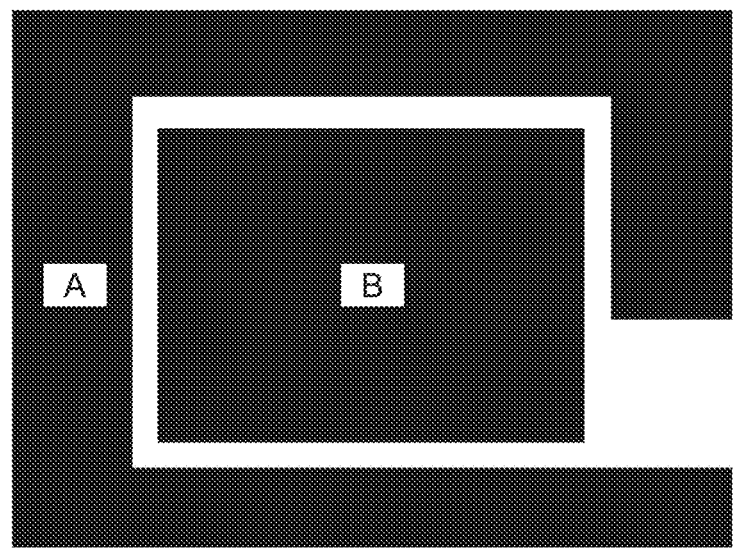
FIG. 7 is a 2-dimensional view of a non-separable part arrangement.
Figure 8:
FIG. 8 is a 2-dimensional view of a separable part arrangement.

An example over an overall packing procedure using an approach described above may be summarized as follows:
1. $f_A^c(x) \leftarrow$ shape of build volume
2. Repeat for each unplaced part B (e.g., in order of decreasing size):
   a. Compute $G_{a,b}^c(\omega) = F_A^c(\omega) F_B^{c*}(\omega)$
   b. Compute $g_{A,B}^c = \mathcal{F}^{-1}(G_{A,B}^c)$
   c. Compute $F_A^d$ and $F_A^v$ from $f_A^c$ and $F_B^t$ from $f_B^c$
   d. Compute $G_{A,B}^d(\omega) = F_A^d(\omega) F_B^{c*}(\omega)$ and $G_{A,B}^v(\omega) = F_A^v(\omega) F_B^{t*}(\omega)$
   e. Compute $g_{A,B}^{pen} = \mathcal{F}^{-1}(\theta G_{A,B}^d + (1-\theta) G_{A,B}^v)$
   f. Search for t such that $g_{A,B}(t)=0$ and minimizes $g_{A,B}^{pen}(t)$
   g. (Optional) Ensure the placing of B at t guarantees A can be disassembled/separated (see below)
   h. Locally refine the placement t using the original geometry of the shape (see below)
   i. If there exists a possible t replace A with the combination of A and B, otherwise add B to an "unplaced" list
3. (Optional) If 2g. is not enabled, dissemble the tray A as a post processing step, which guarantees that after printing, all parts can be separated from each other, e.g., there are no parts placed inside of a cavity of another part in a way that cannot be removed (as shown in FIG. 7).
   a. Iterate over all placed objects in A, dissemble all separable parts
   b. Remove one or more parts from A that are not separable, move them to an "interlocked" list, and then loop over the remaining parts and dissemble them
   c. Repeating step b until the tray A is empty
   d. Iterate over all parts in the "interlocked" list, and then place them into the tray again, following procedures described in 2, with the step 2.g enabled To ensure the manufacturability of the packed tray A, all the packed parts should be able to separate from each other. For example, as shown in FIG. 7, the object B cannot be separated from A following a non-colliding path. On the other hand, the configuration in FIG. 8 can be successfully separated. Additional steps are used to ensure this constraint.

One way of guaranteeing the separability is to make sure the placement t of object B following a non-colliding path from the outside of the tray. To do that, after $g_{A,B}^c(t)$ is computed, some locations outside of the tray are marked as valid. Then, starting from those locations, all reachable locations via a non-colliding and translation-only path can be efficiently found through a breadth first search or flood-fill on $g_{A,B}^c(t)$. Another way of doing this is using a physical based simulator, where in each simulation step, a force is applied to object B until B is separated from A, or after a certain computational budget is reached. Yet another way of doing this is using a geometry-based path planning approach, where the path is found by constructing the Configuration space (C-space). The latter two approaches maybe more expensive than the first one, but they can search for non-colliding path with part rotations.

The disassemble procedure can be executed per each part placement (step 2g. above) or as a postprocess (procedure step 3.). The benefit of per part checking is it ensures every intermediate tray A satisfying the separable constraint, at the cost of higher computing expense. On the other hand, the postprocess checking requires less computing, but already placed parts maybe removed in the postprocess, resulting in less immediate feedback. If all packed parts are relatively convex, the tray is assumed to be separable and the disassemble procedure is skipped.

The procedure above can be considered a "greedy" procedure in which once a part is placed, it is not moved. An alternative procedure may include iterations in which a part is removed from the partial assembly. Also, the selection of the part to add or remove at an iteration may be made on other criteria than size. For example, parts may be selected at random. Similarly, parts to add may be selected at random, possibly biased in favor of adding larger objects. In some examples, a machine-learning (e.g., reinforcement learning) approach may be used for the selection of a part to add or remove based on the shapes of the parts and/or the state of the partial assembly. Note that the particular procedure for selecting and placing parts is a solution to a combinatorial problem, and there are a number of viable alternative approaches. One of such approaches is a beam-search strategy, where only few most promising search directions are explored. Another one is A* search strategy, where the user needs to provide a heuristic function, that estimates the total cost of given search branch approximately. Yet another strategy learns the heuristic functions by exploring the combinatory space, for example, Q-learning.

The procedure above can be extended to support packing of multiple trays. Given a list of unpacked objects, one way of doing this is to pack the first tray with procedure 2., take the "unplaced" list, and pack the next tray, until all the objects are packed. An alternative is to first allocate a fixed number of trays, for each part, computing the preference score for each tray, and placing the part into the best fitting tray.

In some alternatives, rather than the volume quantification, a quantification based on the height dimension of the displacement vector may be used to account for the resulting overall height of the top of the part being placed.

In an alternative, a single convolution may be performed to combine the criteria for non-overlapping parts and proximity of placed parts, for example, by transitioning from a large penalty just inside the existing parts to a preference just outside these parts. However, in at least some implementations, such large discontinuities in the preference distribution have undesirable numerical computation aspects, and therefore separately addressing these two factors is preferred.

Figure 4:
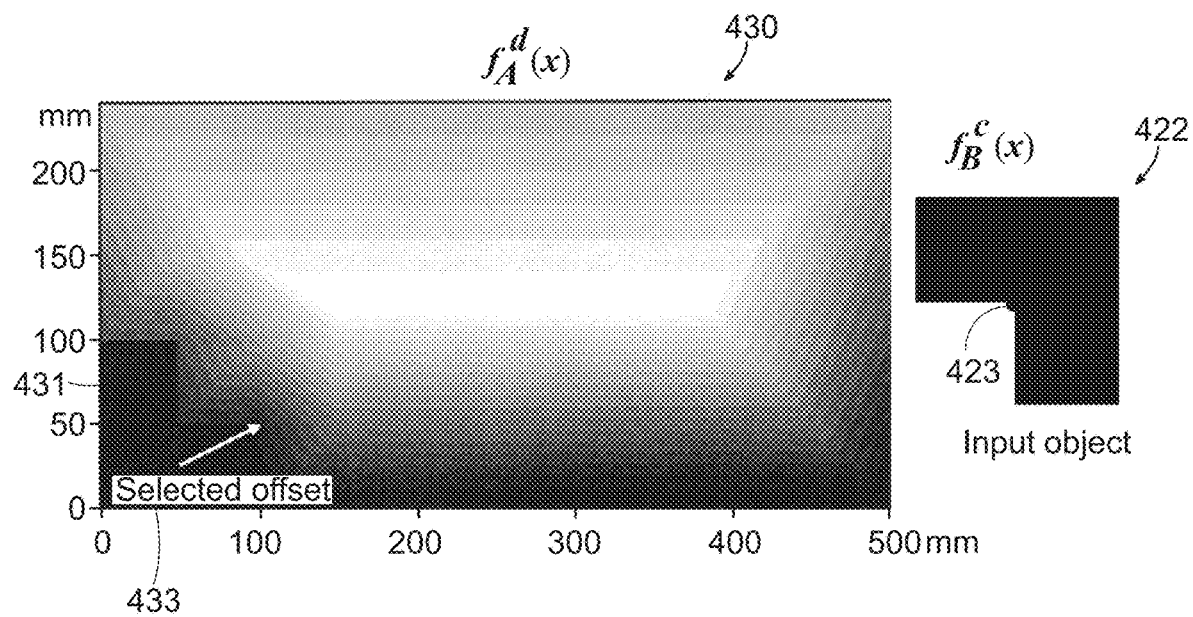
FIG. 4 illustrates a 2-dimensional view of a preference distribution based on a build volume boundary and placement of the first part, and a second part for placement.
Figure 5:
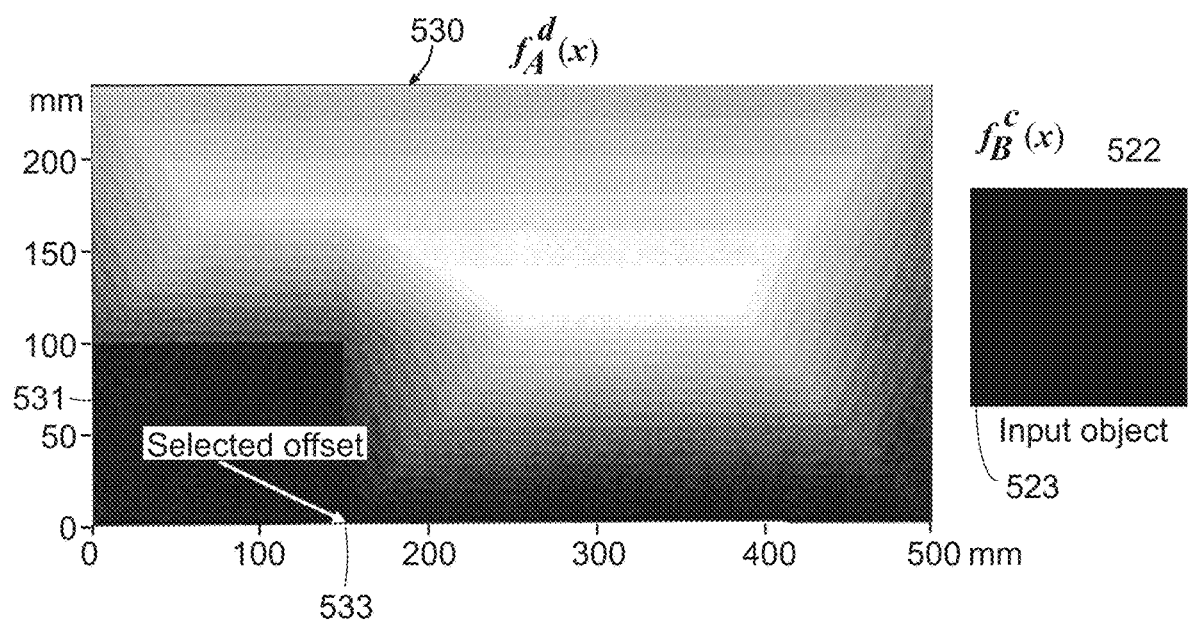
FIG. 5 illustrates a 2-dimensional view of a preference distribution based on a build volume boundary and placement of the first and second parts, and a thrid part for placement.
Figure 6:
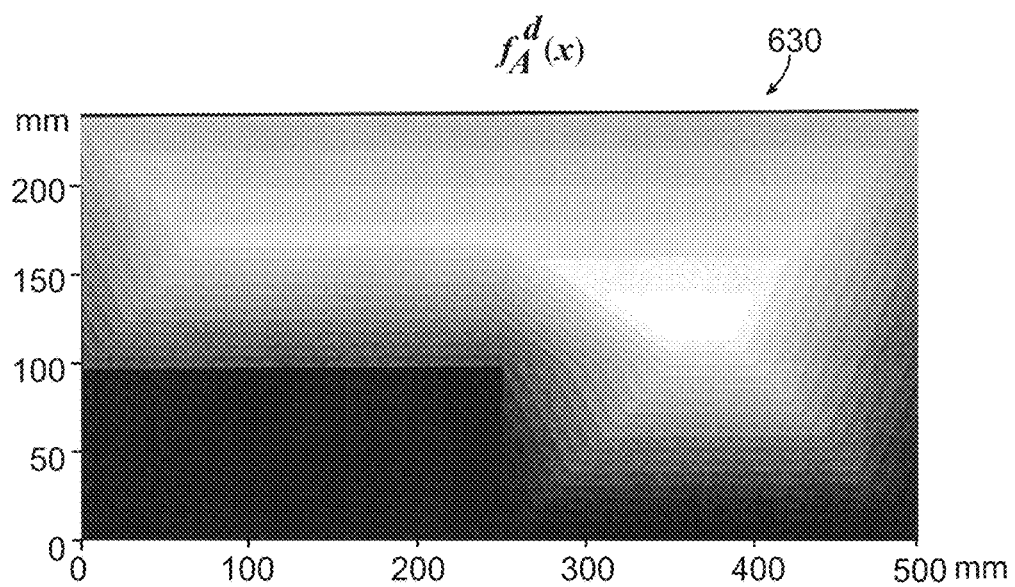
FIG. 6 illustrates a 2-dimensional view of a preference distribution based on a build volume boundary and placement of the first, second and third parts.

Referring to FIGS. 4-6, an example illustrating successive placement of three parts based on a non-overlapping and proximity preference are illustrated. A 2-dimensional view is provided (e.g., which can be interpreted as a 2-dimensional analog of the procedures described above, or a cross-section view of a 3-dimensional implementation).

Figure 3:
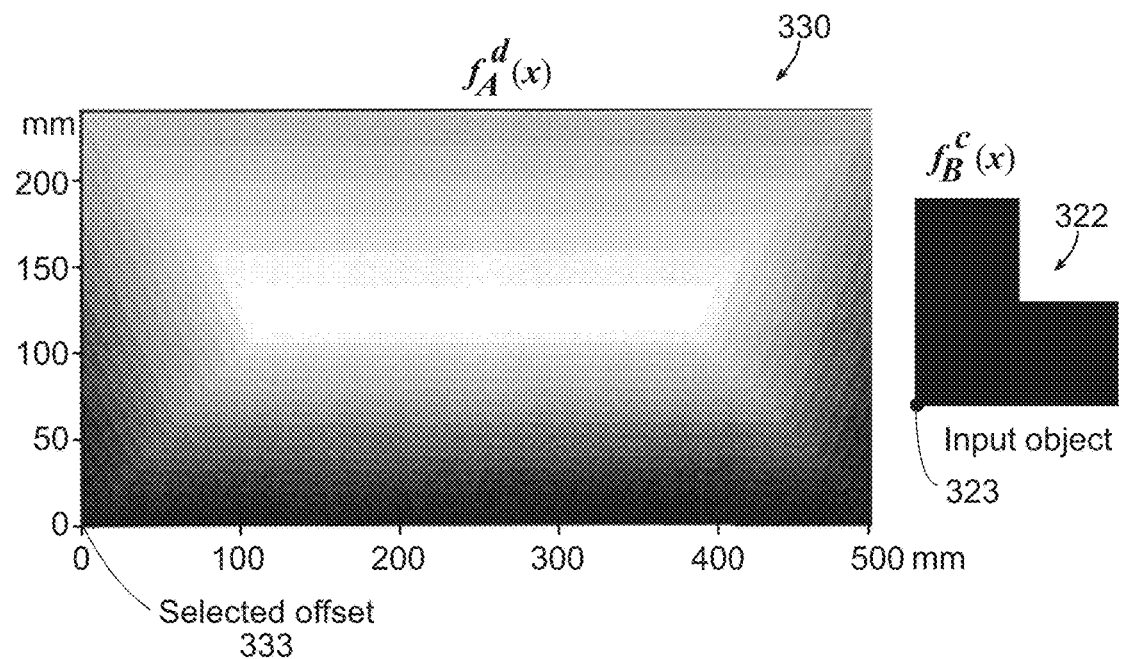
FIG. 3 illustrates a preference distribution based on a build volume boundary, and a first part for placement.

In FIG. 3, the object A is made up of only the boundary of the build volume, and a preference distribution $f_A^d(x)$ 330 (with darker representing increased preference) shows preference to placing the next part near the build volume boundary. A first part B has a shape represented by $f_B^c(x)$ 322, which is defined relative to its origin 323. A suitable positioning of the part B is then at the selected offset 333 illustrated on the preference distribution 330.

Referring to FIG. 4, after placement of first part, the object A is updated to be the combination of the build volume boundary and the placed first part, and the resulting preference distribution $f_A^d(x)$ 430 shows preference to placing the second part near placed first part. A second part B has a shape represented by $f_B^c(x)$ 422, which is defined relative to its origin 423. A suitable positioning of the second part B is then at the selected offset 433 illustrated on the preference distribution 430.

Referring to FIG. 5, after placement of first and second parts, the object A is updated to be the combination of the build volume boundary and the placed parts, and the resulting preference distribution $f_A^d(x)$ 530 shows preference to placing the third part near placed parts. A third part B has a shape represented by $f_B^c(x)$ 522, which is defined relative to its origin 523. A suitable positioning of the second part B is then at the selected offset 533 illustrated on the preference distribution 530.

Referring to FIG. 6, after placement of first, second and third parts, the object A is updated to be the combination of the build volume boundary and the placed parts, and the resulting preference distribution $f_A^d(x)$ 630.

Figure 9:
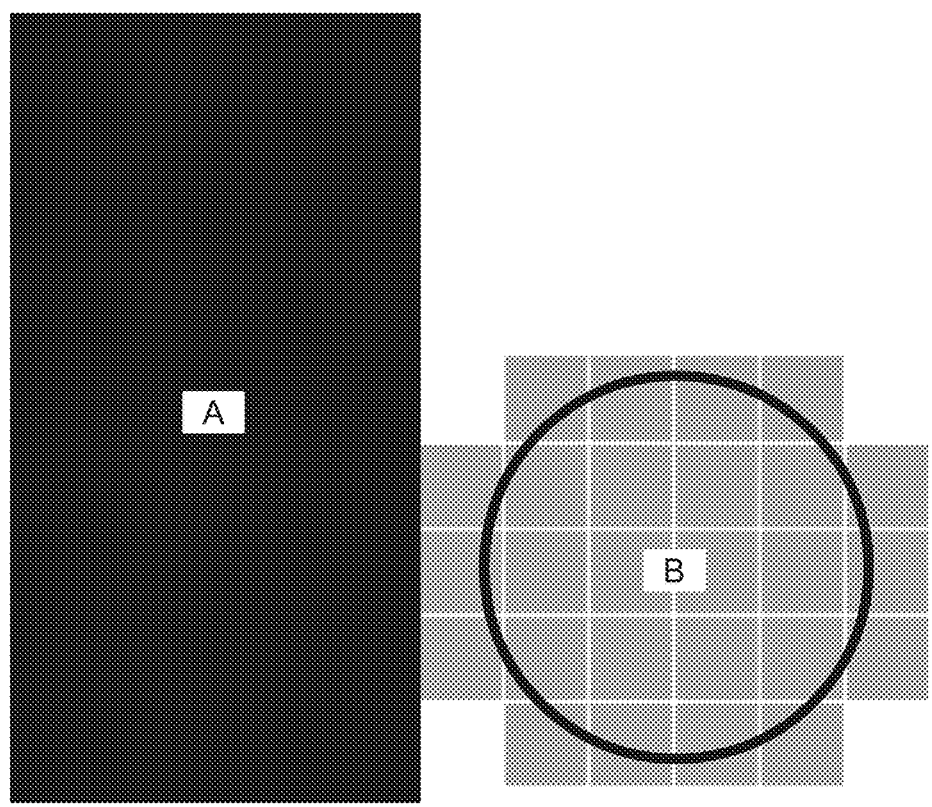
FIG. 9 is a 2-dimensional view of a part placement formed with low-resolution voxels.
Figure 10:
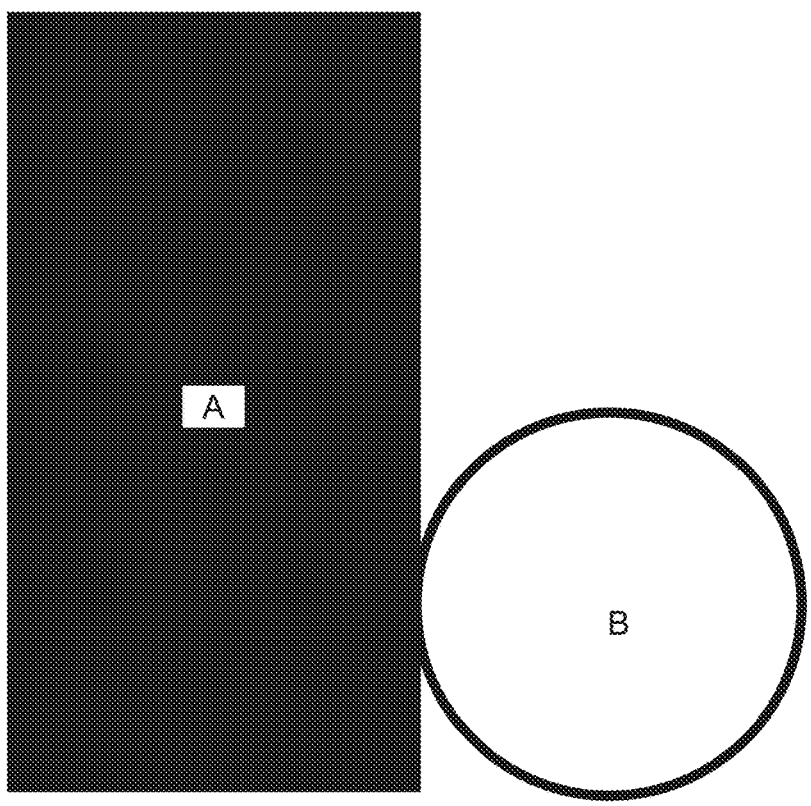
FIG. 10 is a 2-dimensional view of placement of parts of FIG. 9 at an original resolution.

In some alternatives, a packing procedure uses a lower resolution (e.g., downsampled voxel representation) to determine initial placements, which can then be refined using higher resolution representations (e.g., by successively moving each placed part incrementally relative to the other placed parts, where the original geometry is used for collision detection.). For example, FIG. 9 shows an arrange of part B near part A found by low resolution voxels, while FIG. 10 shows a refinement of the arrangement at an original resolution in which the parts are able to be arranged more closely to one another.

Implementations of the approaches described above are amenable to parallelization, and more particularly to implementation on Graphics Processing Units (GPUs). For example, the Fourier Transform computations, as well as the search to locate best offsets for placements can be performed on a GPU.

While the approaches described above may be suitable to a box shaped build volume, arbitrary-shaped build volume can also be supported. In this case, the bounding box of the build volume is first computed, any voxels that are outside of the specified build volume are marked as occupied. For example, a different fabrication system may use a cylindrical build volume. The minimum separation distance can be satisfied by simply expanding the object voxels. Furthermore, while described in the context of arranging parts in a build volume for 3D fabrication, the approaches can be used in variety 2D and 3D packing/arrangement problems, for example, for arranging packages for storage or shipment. Within the domain of 3D fabrication, the approaches can be used not only for jetted fabrication, but other printing approaches as well, for example, involving powder-based binder jetting/laser sintering. The packing approach can also be applied to 2D packing problems, for example, for CNC milling.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for arranging a plurality of parts into a build volume for three-dimensional fabrication, the method comprising:
    receiving a specification of a shape for each part of a plurality of parts;
    arranging the parts in a build volume, including for at least a first part of the plurality of parts arranging the first part relative to an arrangement including one or more previously arranged parts of the plurality of parts;
        using a first spatial frequency domain representation of the shape of the first part determined from the first part and using a second spatial frequency domain representation of the arrangement;
        determining a location of the first part relative to the arrangement; and
        adding the first part to the arrangement at the determined location;
    forming a build volume specification for three-dimensional fabrication according to the arrangement; and
    providing the build volume specification for use in a three-dimensional fabrication system.

2. The method of claim 1, wherein the specification of the shape comprises a voxel representation of locations occupied in the shape.

3. The method of claim 1, further comprising determining spatial frequency domain representations of shapes of at least some parts of the plurality of parts.

4. The method of claim 1, wherein determining the location of the first part relative to the arrangement includes processing the first spatial frequency domain representation and the second spatial frequency domain representation to yield a third spatial frequency domain representation, and processing the third spatial frequency domain representation to yield third spatial representation.

5. The method of claim 4, wherein determining the location of the first part relative to the arrangement further includes processing the third spatial domain representation including searching the third spatial representation for the location.

6. A method for arranging a plurality of parts into a build volume for three-dimensional fabrication, the method comprising:
receiving a specification of a shape for each part of a plurality of parts;
arranging the parts in a build volume, including for at least a first part of the plurality of parts arranging the first part relative to an arrangement including one or more previously arranged parts of the plurality of parts;
using a first spatial frequency representation of the shape of the first part determined from the first part and using a second spatial frequency representation of the arrangement, determining a location of the first part relative to the arrangement; and
adding the first part to the arrangement at the determined location;
forming a build volume specification for three-dimensional fabrication according to the arrangement; and
providing the specification of the build volume for use in a three-dimensional fabrication system,
wherein using a first spatial frequency representation of the shape of the first part comprises a Fourier Transform of a volume occupied by the first part.

7. The method of claim 1, wherein using the second spatial frequency domain representation of the arrangement comprises a Fourier Transform of a preference distribution at a set of possible offsets of the first part relative to the arrangement.

8. The method of claim 7, wherein the preference distribution represents one or more of (a) a preference for placement of the first part in proximity to the arrangement, (b) a preference to reduce support volume for supporting the first part and the arrangement, and (c) a preference of reduced overall height of the first part and the arrangement within the build volume.

9. The method of claim 1, wherein using the first spatial frequency domain representation of the shape of the first part determined from the first part and the second spatial frequency domain representation of the arrangement includes determining a third spatial frequency domain representation over a set of possible offsets of the first part relative to the arrangement.

10. The method of claim 9, wherein using the first spatial frequency domain representation of the shape of the first part determined from the first part and the second spatial frequency domain representation of the arrangement further includes determining a spatial distribution over a set of possible offsets of the first part relative to the arrangement.

11. The method of claim 10, wherein determining a spatial distribution over a set of possible offsets of the first part relative to the arrangement includes determining an inverse Fourier Transform of the third spatial frequency domain distribution.

12. The method of claim 1, wherein for at least the first part of the plurality of parts, using a plurality of rotations of the first part to determine a rotation of said first part for adding to the arrangement.

13. The method of claim 12, further comprising determining a spatial frequency domain representation of the first part in each of the plurality of rotations.

14. The method of claim 1, wherein for at least one part of the plurality of parts, the spatial frequency domain representation of the arrangement represents a build volume without any parts yet placed within it.

15. The method of claim 1,
wherein the specification of the shape comprises a voxel representation of locations occupied in the shape;
wherein determining the location of the first part relative to the arrangement includes processing the first spatial frequency domain representation and the second spatial frequency domain representation to yield a third spatial frequency domain representation, and processing the third spatial frequency domain representation to yield a third spatial representation;
wherein using a first spatial frequency domain representation of the shape of the first part comprises a Fourier Transform of a volume occupied by the first part; and
wherein using the second spatial frequency domain representation of the arrangement comprises a Fourier Transform of a preference distribution at a set of possible offsets of the first part relative to the arrangement.

16. A system for arranging a plurality of parts into a build volume for three-dimensional fabrication, the system comprising one or more hardware processors, and a storage for instructions for execution by said one or more hardware processors that when executed cause the system to:
receive a specification of a shape for each part of a plurality of parts;
arrange the parts in a build volume, including for at least a first part of the plurality of parts arranging the first part relative to an arrangement including one or more previously arranged parts of the plurality of parts;
using a first spatial frequency domain representation of the shape of the first part determined from the first part and using a second spatial frequency domain representation of the arrangement; determining a location of the first part relative to the arrangement; and
adding the first part to the arrangement at the determined location;
form a build volume specification for three-dimensional fabrication according to the arrangement; and
provide the build volume specification for use in a three-dimensional fabrication system.

17. The system of claim 16, wherein at least some of the hardware processors comprise graphics processing units capable of parallel computations.

18. A non-transitory machine-readable medium comprising instructions stored thereon, the instructions when executed by one or more hardware processors cause said processors to:
receive a specification of a shape for each part of a plurality of parts;
arrange the parts in a build volume, including for at least a first part of the plurality of parts arranging the first part relative to an arrangement including one or more previously arranged parts of the plurality of parts;

using a first spatial frequency domain representation of the shape of the first part determined from the first part and using a second spatial frequency domain representation of the arrangement; determining a location of the first part relative to the arrangement; and adding the first part to the arrangement at the determined location;

form a build volume specification for three-dimensional fabrication according to the arrangement; and provide the build volume specification for use in a three-dimensional fabrication system.

\* \* \* \* \*